United States Patent [19]

Inaba et al.

[11] Patent Number: 4,818,352

[45] Date of Patent: Apr. 4, 1989

[54] ELECTRODEPOSITION OF FUNCTIONAL FILM ON ELECTRODE PLATE RELATIVELY HIGH IN SURFACE RESISTIVITY

[75] Inventors: Hiroshi Inaba, Matsusaka; Kiyoshi Nakase, Mie; Yukitoshi Yanagida, Matsusaka, all of Japan

[73] Assignee: Central Glass Company, Limited, Ube, Japan

[21] Appl. No.: 45,479

[22] Filed: May 4, 1987

[51] Int. Cl.[4] .................................. C25B 3/00
[52] U.S. Cl. ..................... 204/59 R; 204/72; 204/91; 204/14.1; 204/20; 204/38.1; 204/56.1; 350/357
[58] Field of Search ............. 204/56.1, 57, 59 R, 204/59 M, DIG. 7, 290 R, 38.4, 14.1, 286, 20, 38.1, 72, 91; 350/357

[56] References Cited

U.S. PATENT DOCUMENTS

| | | | |
|---|---|---|---|
| 1,282,263 | 10/1918 | Merritt | 204/DIG. 7 |
| 1,335,176 | 3/1920 | Merritt | 204/DIG. 7 |
| 3,023,154 | 2/1962 | Hough et al. | 204/DIG. 7 |
| 3,437,578 | 4/1969 | Gibbs et al. | 204/DIG. 7 |
| 4,433,901 | 2/1984 | Takahashi et al. | 350/357 |
| 4,498,739 | 2/1985 | Itaya et al. | 350/357 |
| 4,502,934 | 3/1985 | Gazard et al. | 350/357 |
| 4,505,021 | 3/1985 | Hamada et al. | 350/357 |
| 4,613,211 | 9/1986 | Papir et al. | 350/357 |

Primary Examiner—John F. Niebling
Assistant Examiner—Stephen P. Marquis
Attorney, Agent, or Firm—Fleit, Jacobson, Cohn & Price

[57] ABSTRACT

The invention relates to an electrodeposition method for forming a film of an electrochemically synthesizable and functional substance, e.g. Prussian blue useful as an electrochromic material, on an electrode plate having a conductive coating film relatively high in surface resistivity such as a tin dioxide or indium trioxide film. A desired film of uniform thickness can be formed even when the electrode plate is as large as 40 cm square or is still larger by providing the electrode plate with an elongate auxiliary electrode element formed of, for example, a metal wire or foil, which is attached to the outer surface of the conductive coating film so as to extend at least along the whole periphery of the electrode plate.

14 Claims, 2 Drawing Sheets

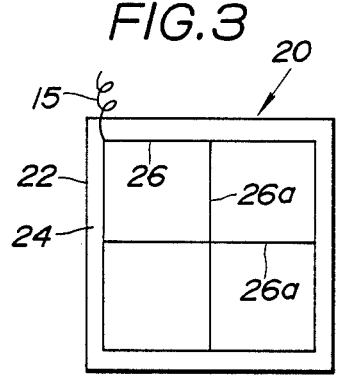
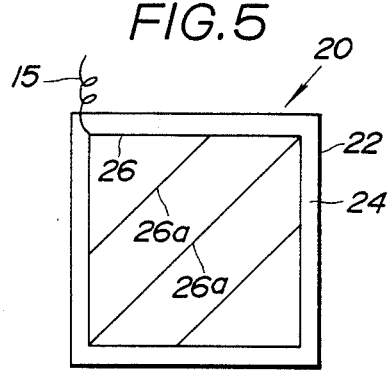
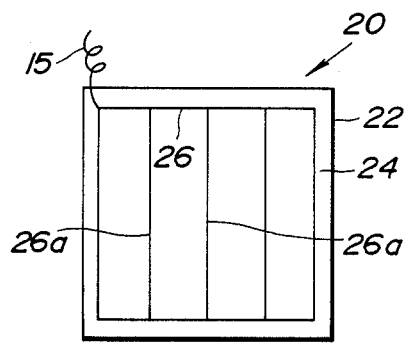
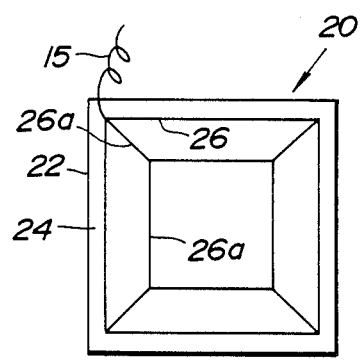
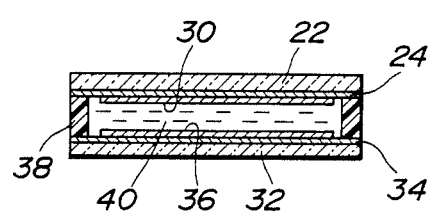

ELECTRODEPOSITION OF FUNCTIONAL FILM ON ELECTRODE PLATE RELATIVELY HIGH IN SURFACE RESISTIVITY

BACKGROUND OF THE INVENTION

This invention relates to a method of electrolytically depositing a film of an electrochemically synthesizable functional substance such as, for example, Prussian blue useful as an electrochromic material on an electrode plate having a conductive coating film relatively high in surface resistivity.

Besides electrodeposition of metals familiar as electroplating, electrodeposition of some electrochemically synthesizable and functional substances has been put into practical use. An example of such functional substances is Prussian blue useful as an electrochromic material.

In many cases the electrode plate on which a film of an electrochromic or otherwise functional substance is to be deposited is a glass or synthetic resin plate having a conductive coating film such as, for example, a tin dioxide film. If the conductive coating film is sufficiently low in surface resistivity, viz. lower than about $3\Omega/cm^2$, electrodeposition of a desired film on that conductive film can easily be accomplished even though the electrode plate is as large as about 40 cm square. In practice, however, the surface resistivity of the conductive film on the electrode plate is usually higher than $3\Omega/cm^2$ and ranges from about 5 to about $5\Omega/cm^2$. With such a relatively high surface resistivity of the conductive coating film on the electrode plate it is difficult to obtain a desired film of uniform thickness and quality by a conventional electrodeposition method unless the effective surface area of the electrode plate is smaller than about 100 $cm^2$.

SUMMARY OF THE INVENTION

It is an object of the present invention to provide an improved electrodeposition method for forming a film of a desired functional substance on an electrode plate having a conductive coating film relatively high in surface resistivity with uniform thickness of the electrodeposited film even when the effective surface area of the electrode plate is considerably larger than 100 $cm^2$.

To accomplish the above object the present invention provides a method of electrochemically depositing a film of an electrochemically synthesizable substance, which may be an electrochromic substance or an electroconductive substance for example, on an electrode plate comprising a substrate and a conductive coating film not lower than $3\Omega/cm^2$ in surface resistivity by immersing the electrode plate and another electrode in an electrolytic liquid and causing a DC current of a predetermined density to flow between said electrode plate and said another electrode, the method being characterized in that said electrode plate is provided with an elongate auxiliary electrode element which is attached to the outer surface of said conductive coating film and extends at least along the whole periphery of the conductive coating film and that the auxiliary electrode element is used as the electric terminal of said electrode plate in applying a DC voltage across said electrode plate and said another electrode to produce said current.

For example, the auxiliary electrode element according to the invention is provided by using a thin wire or foil of a relatively low resistivity metal such as copper. The auxiliary electrode element is effective in decreasing the magnitude of voltage drop attributed to electric resistance of the electrode plate and uniforming the distribution of the electrolyzing current over the surface area of the conductive film on the electrode plate. Consequently, the film formed by the electrodeposition method according to the invention is very uniform in film thickness even when the surface area of the film is considerably larger than 100 $cm^2$.

This invention is advantageously applicable to electrodeposition of electrochromic materials such as Prussian blue, $MoO_3$, $NiOOH$, polypyrrole and polythiophene, though this is not limitative of the invention.

When the electrode plate on which a desired film is to be deposited is up to about 1600 $cm^2$ in effective surface area, it suffices that the auxiliary electrode element extends just along the whole periphery of the plate at a short distance from each edge of the plate. In the cases of still larger electrode plates, it is preferble that the auxiliary electrode element comprises an essential portion extending along the whole periphery of the electrode plate and at least one supplementary portion which is arranged so as to divide the area enclosed by the essential portion into a plurality of segments.

BRIEF DESCRIPTION OF THE DRAWINGS

FIG. 3 shows a different arrangement of the auxiliary electrode element on the electrode plate of FIG. 2;

FIG. 4 is a sectional view of an electrochromic display device having an electrochromic film which can advantageously be formed by a method according to the invention; and FIGS. 5–7 show still different arrangements of the auxiliary electrode element on the electrode plate of FIG. 2.

DESCRIPTION OF THE PREFERRED EMBODIMENTS

EXAMPLE 1

Figure 1:
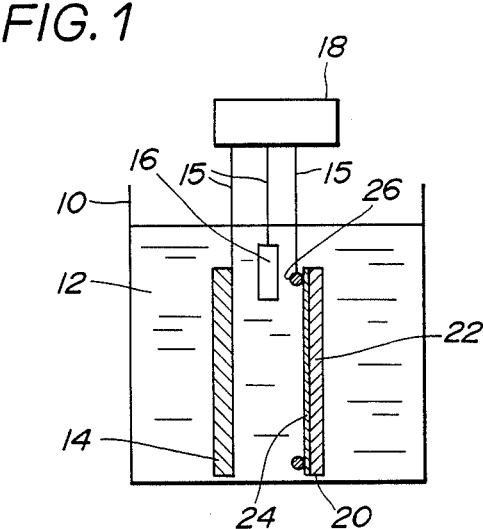
FIG. 1 is a schematic and sectional illustration of an electrodeposition apparatus for forming a film by a method according to the invention.

FIG. 1 shows a laboratorial electrolytic vessel 10 used in this example. The electrolyte liquid 12 was an aqueous mixed solution containing 0.005 mol/liter of $K_3Fe(CN)_6$ and 0.005 mol/liter of $FeCl_3$. First and second electrode plates 14 and 20 were immersed in the electrolyte liquid 12 in an opposite and appropriately spaced arrangement. Numeral 16 indicates a saturated calomel electrode used as a reference electrode. For electrodeposition of Prussian blue represented by the formula $Fe_4^{III}[Fe^{II}(CN)_6]_3$ on the second electrode plate 20, the two electrode plates 14, 20 and the reference electrode 16 were connected to a potentiostat (constant-voltage and constant-current supply) 18 with lead wires 15.

Figure 2:
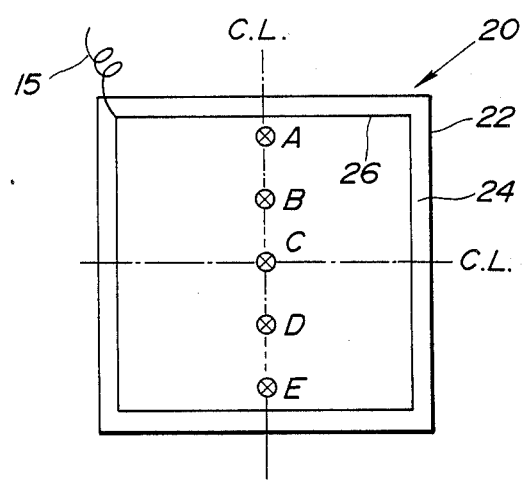
FIG. 2 is a plan view of an electrode plate on which a desired film is to be electrodeposited and which comprises an auxiliary electrode element according to the invention.

The first electrode plate 14 was a 300 mm square plate of platinum. The second electrode plate 20 was basically constituted of a 400 mm square and 3.5 mm thick plate of glass 22 and a conductive and transparent film of $SnO_2$ 24 deposited on one surface of the glass plate 22. The conductive film 24 had a surface resistivity of $25\Omega/cm^2$. As an auxiliary electrode element 26, a copper wire having a diameter of 0.5 mm was placed on the conductive film 24 in the pattern as shown in FIG. 2. That is, the copper wire 26 was extended along the four sides of the square electrode plate 20 at a constant distance of 10 mm from each side edge of the plate 20. The copper wire 26 was fixed to the conductive film 24 by using a masking tape (not shown).

In the film forming operation the potentiostat 18 was regulated so as to supply a constant DC current of 5 $\mu A/cm^2$ between the first and second electrode plates 14 and 20 while making reference to the potential of the reference electrode 16. The electrolytic operation was continued for 50 min to thereby deposit Prussian blue on the conductive film 24 of the second electrode plate 20 to a thickness of about 0.4 $\mu m$. The thickness of the Prussian blue film formed by this operation was precisely measured at the five points A to E indicated in FIG. 2 to examine the degree of uniformity of the film thickness. The measurements are shown in Table 1.

COMPARATIVE EXAMPLE

The second electrode plate 20 used in Example 1 was modified by drastically diminishing the auxiliary electrode element 26. That is, the copper wire 26 (0.5 mm diameter) was disposed only along the upper horizontal side of the electrode plate 20. Otherwise, the electrolytic apparatus was as used in Example 1, and electrodeposition of Prussian blue was carried out under the same conditions as in Example 1. The thickness of the Prussian blue film formed on the second electrode plate 20 was precisely measured at the five points A to E indicated in FIG. 2. The results were as shown in Table 1.

TABLE 1

| Point of Measurement | Film Thickness (nm) Example 1 | Film Thickness (nm) Comparative Example 1 |
|---|---|---|
| A | 410 | 520 |
| B | 400 | 430 |
| C | 390 | 400 |
| D | 400 | 370 |
| E | 410 | 330 |
| average (dispersion) | 400 (+10) | 413 (+120 / −70) |

EXAMPLE 2

A Prussian blue film was formed by using substantially the same electrodeposition apparatus as in Example 1. In this example the second electrode plate 20 was basically constituted of a 800 mm square and 3.5 mm thick glass plate 22 and a conductive coating film 24 having a surface resistivity of 25 $\Omega/cm^2$. Referring to FIG. 3, the auxiliary electrode element 26 on this electrode plate 20 was a copper wire (0.5 mm diameter) extended along the four sides of the square electrode plate 20 and, furthermore, as indicated at 26a, crosswise along the horizontal and vertical center axes of the plate 20. Electrodeposition deposition of Prussian blue on this electrode plate 20 was carried out by the same method and under the same conditions as in Example 1. The thickness of the obtained Prussian blue film was 408±10 nm.

In general electrodeposited functional coating films such as electrochromic films and conductive films are required to be uniform in thickness with dispersion as narrow as possible. Particularly with respect to electrochromic films it is strongly desired that dispersion of the film thickness be not more than ±10% and preferably not more than ±5% since unevenness of the film thickness becomes a serious cause of unevenness of color tone. The foregoing Examples 1 and 2 demonstrate that by the electrodeposition method according to the invention it is possible to form a Prussian blue (electrochromic) film which has a fairly large surface area and in which dispersion of the film thickness is as narrow as ±2.5%.

EXAMPLE OF USE OF THE INVENTION

FIG. 4 shows an electrochromic display device of a known construction. The Prussian blue film formed in Example 1, indicated at 30 in FIG. 4, was used in this device. That is, the glass plate 22 of the electrode plate 20 in FIGS. 1 and 2 was used as a transparent front substrate of the display device and the overlying laminate of the transparent conductive film 24 and the Prussian blue film 30 as a first display electrode. The electrochromic display device included a back substrate 32 of transparent glass which was coated with a transparent conductive film 34. As a second display electrode, a $WO_3$ film 36 was formed by a vacuum deposition method on the conductive film 34. The two glass plates 22 and 32 were held opposite to and slightly spaced from each other by a peripheral seal layer 38, and the space defined between the two plates 22 and 32 was filled up with an electrolyte liquid 40, which was 1 mol/liter solution of $LiClO_4$ in propylene carbonate.

The Prussian blue film 30 as electrodeposited was in an electrochemically oxidized state and accordingly assumed a blue color. The $WO_3$ film as deposited too was in an electrochemically oxidized state and accordingly remained colorless. Preparatory to practical drive of the electrochromic display device the Prussian blue film 30 was bleached by a usual electrochemical reduction treatment. After that a DC voltage of +1 V was applied between the first display electrode comprising Prussian blue 30 and the second display electrode comprising $WO_3$ 36. Soon coloration of the both display electrodes took place such that a clear blue color was exhibited uniformly over the entire display area of the device. In the colored state, visible light transmittance of the electrochromic display device was about 10%. Next, a DC voltage of −0.5 V was applied between the first and second display electrodes. Soon bleaching took place over the entire display area such that the display device turned a transparent cell which exhibited visible light transmittance of about 80%.

The substrate (22) of the electrode plate (20) is not necessarily transparent and may be either glass or plastics. The material of the conductive film 24 is not limited to $SnO_2$ and may alternatively be $In_2O_3$ as another example.

The material of the auxiliary electrode element 26 may be any metal convenient for practical use such as, for example, copper, silver, aluminum, gold, platinum, tungsten, molybdenum, cobalt, nickel, tin, iron or titanium or an alloy. Either a wire or a foil of a selected metal or alloy can be used. Also it is possible to use carbon as the conductive material of the auxiliary electrode element 26. Still alternatively, the auxiliary electrode element 26 can be formed by application of a conductive paste or a conductive paint. For example, the auxiliary electrode element 26 may comprise a conductive stripe formed by applying a wet composition comprising a conductive powder onto the conductive coating film and baking the applied composition. If desired, a metal foil may be laid on a stripe formed of a conductive paste or paint. When the film deposited on the electrode plate 20 is of an electrochromic material for use in an electrochromic display device, the auxiliary electrode element 26 formed by using a conductive paste or paint can be reused as an auxiliary electrode of the display device.

As to the arrangement or pattern of the auxiliary electrode element 26, the simple arrangement of FIG. 2 is suitable when the surface area of the electrode plate 20 is not larger than about 1600 cm$^2$ (400 mm square). When the electrode plate 20 is larger than about 1600 cm$^2$, in many cases it is preferable that the auxiliary electrode element 26 consists of the essential portion extending along the whole periphery of the electrode plate 20 and supplementary portions such as, for example, the crosswise portions 26a in FIG. 3 which divide the area enclosed by the essential portion into a plurality of segments. Such supplementary portions 26a of the auxiliary electrode element 26 can be arranged in various patterns as shown, for example, in FIGS. 5-7 besides FIG. 3. In the case of forming a film of an electrochromic material by the method according to the invention, it is practicable to form a very large-sized film that could not be formed by conventional electrodeposition methods by using the auxiliary electrode element 26 including supplementary portions 26a. There is an additional advantage in forming an electrochromic film by using the auxiliary electrode element 26 including supplementary portions 26a. That is, the film is divided into a plurality of segments which are separated from each other since the film does not exist at narrow areas occupied by the auxiliary electrode element 26 (including supplementary portions 26a) and, therefore, are colorable and bleachable each individually. Accordingly it is possible to use the electrochromic film in various display boards or ornamental boards by suitably determining the pattern of dividing the film into several segments, i.e. by suitably determining the pattern of the supplementary portions 26a of the auxiliary electrode element 26.

The following are good examples of applications of the present invention, besides electrodeposition of a Prussian blue film described hereinbefore. Electrodeposition of a film of MoO$_3$ is accomplished by electrolysis of an aqueous solution of Li$_2$MoO$_4$ (for example, 0.003 mol/liter) of which the pH is adjusted to 1.5 with a constant current of, for example, 50 $\mu$A/cm$^2$. Electrodeposition of a film of NiOOH is accomplished by electrolysis of a mixed aqueous solution which contains 0.005 mol/liter (for example) of NiSO$_4$ and 0.015 mol/liter (for example) of (NH$_4$)$_2$SO$_4$ and of which the pH is adjusted to 8.5 with a constant current of, for example, 300 $\mu$A/cm$^2$. A film of polypyrrole or polythiophene is formed by electrolytic polymerization of pyrrole or thiophene monomer in an electrolyte liquid prepared by mixing 0.1 mol/liter (for example) solution of LiClO$_4$ in propylene carbonate with 0.1 mol/liter (for example) solution of LiBF$_4$ in propylene carbonate with a constant current of, for example, 1-9 $\mu$A/cm$^2$.

What is claimed is:

1. A method of electrolytically depositing a film of an electrochemically synthesizable substance on an electrode plate, which comprises a substrate and a conductive coating film not lower than 3$\Omega$/cm$^2$ in surface resistivity, by immersing said electrode plate and another electrode in an electrolytic liquid and causing a DC current of a predetermined density to flow between said electrode plate and said another electrode, characterized in that said electrode plate is provided with an elongate auxiliary electrode element which is attached to the outer surface of said conductive coating film and extends at least along the whole periphery of said conductive coating film and that said auxiliary electrode element is used as the electric terminal of said electrode plate in producing said current.

2. A method according to claim 1, wherein said auxiliary electrode element comprises a metal wire.

3. A method according to claim 1, wherein said auxiliary electrode element comprises a metal foil.

4. A method according to claim 1, wherein said auxiliary electrode element comprises a conductive stripe formed by applying a wet composition comprising a conductive powder onto said conductive coating film and baking the applied composition.

5. A method according to claim 1, wherein said auxiliary electrode element comprises an essential portion which extends in a marginal region of said conductive coating film along the whole periphery of said conductive coating film and at least one supplementary portion which extends within the area enclosed by said essential portion so as to divide said area into a plurality of segments.

6. A method according to claim 1, wherein said conductive coating film is formed of a transparent metal oxide selected from the group consisting of SnO$_2$ and In$_2$O$_3$.

7. A method according to claim 1, wherein said electrochemically synthesizable substance is Prussian blue.

8. A method according to claim 7, wherein said electrolytic liquid comprises an aqueous mixed solution of K$_3$Fe(CN)$_6$ and another ferric salt.

9. A method according to claim 1, wherein said electrochemically synthesizable substance is MoO$_3$.

10. A method according to claim 9, wherein said electrolytic liquid comprises an aqueous solution of Li$_2$MoO$_4$.

11. A method according to claim 1, wherein said electrochemically synthesizable substance is NiOOH.

12. A method according to claim 11, wherein said electrolytic liquid comprises an aqueous mixed solution of NiSO$_4$ and an ammonium salt.

13. A method according to claim 1, wherein said electrochemically synthesizable substance is an electrochromic polymer selected from the group consisting of polypyrrole and polythiophene.

14. A method according to claim 13, wherein said electrolytic liquid comprises the monomer of said polymer, at least one lithium salt and an organic solvent.

* * * * *